United States Patent
Straeussnigg

(10) Patent No.: US 7,123,661 B2
(45) Date of Patent: Oct. 17, 2006

(54) DATASTREAM TRANSMITTERS FOR DISCRETE MULTITONE SYSTEMS

(75) Inventor: Dietmar Straeussnigg, Villach (AT)

(73) Assignee: Infineon Technologies AG, Munich (DE)

( * ) Notice: Subject to any disclaimer, the term of this patent is extended or adjusted under 35 U.S.C. 154(b) by 940 days.

(21) Appl. No.: 10/175,504

(22) Filed: Jun. 19, 2002

(65) Prior Publication Data
US 2003/0018920 A1    Jan. 23, 2003

(30) Foreign Application Priority Data
Jun. 19, 2001    (DE) ............... 101 29 331

(51) Int. Cl.
*H04K 1/10*    (2006.01)
(52) U.S. Cl. ...................... 375/260; 375/350
(58) Field of Classification Search ................ 375/219, 375/225, 232–233, 260, 350, 222; 370/465; 708/300; 713/202, 316
See application file for complete search history.

(56) References Cited

U.S. PATENT DOCUMENTS

| | | | |
|---|---|---|---|
| 4,912,667 A | 3/1990 | Rabenstein | 364/724.13 |
| 5,289,395 A | 2/1994 | Nagel et al. | 364/724.01 |
| 6,064,962 A * | 5/2000 | Oshikiri et al. | 704/262 |
| 6,987,812 B1* | 1/2006 | Schenk | 375/260 |
| 2002/0001355 A1 | 1/2002 | Tore | 375/350 |
| 2003/0007551 A1* | 1/2003 | Strauessnigg | 375/229 |
| 2003/0026352 A1* | 2/2003 | Straeussnigg | 375/295 |
| 2003/0165159 A1* | 9/2003 | Straussnigg | 370/465 |

FOREIGN PATENT DOCUMENTS

DE    4124836    1/1993

* cited by examiner

*Primary Examiner*—Emmanuel Bayard
*Assistant Examiner*—Lawrence B. Williams
(74) *Attorney, Agent, or Firm*—Fish & Richardson P.C.

(57) ABSTRACT

A method for transmitting an analog datastream includes coding data input into a data input device. The resulting coded data is assembled into coded data blocks. These blocks are transformed into at least one discrete multitone symbol. An initial filter value extracted from the discrete multitone symbol is forwarded to a stored-value determining device, to which a frame alignment signal has been applied. A stored value for a first filtering device is determined as a function of the at least one initial filter value and the frame alignment signal. This value, and the multitone symbol, are applied to the first filtering device, thereby generating a filtered discrete multitone symbol. The filtered symbol is forwarded to a second filtering device to which the stored value determined in the stored-value determining device is applied, thereby generating a transient-compensated discrete multitone symbol. This is then converted into an analog signal for transmission.

20 Claims, 7 Drawing Sheets

DATASTREAM TRANSMITTERS FOR DISCRETE MULTITONE SYSTEMS

FIELD OF INVENTION

The invention relates to transmitting an analog datastream from a datastream transmitter to a datastream receiver.

RELATED APPLICATIONS

This application claims the priority date of German application 101 29 331.3, filed on Jun. 19, 2001, the contents of which are herein incorporated by reference.

BACKGROUND

Usually, a multitone method (DMT—discrete multitone) is used for asymmetric datastream transmission via normal telephone lines, normal telephone lines usually being constructed as asymmetric digital subscriber lines (ADSL).

An essential advantage of ADSL transmission techniques consists in being able to use conventional cable networks for a transmission, twisted copper pairs normally being used.

High-speed digital subscriber lines of the prior art are described, for example, in the publication "High-speed digital subscriber lines, IEEE Journal Sel. Ar. In Comm., Vol. 9, No. 6, August 1991".

Among the transmission methods with a high data rate, which are based on digital subscriber lines (DSL), a number of VDSL (Very High Data Rate DSL) arrangements are known and, for example, methods such as carrierless amplitude/phase (CAP), discrete wavelet multitone (DWMT), single line code (SLC) and discrete multitone (DMT) can be used for these. In the DMT method, the transmit signal is provided from multiple sinusoidal or cosinusoidal signals, where both the amplitude and the phase can be modulated of each individual sinusoidal or cosinusoidal signal. The multiple modulated signals thus obtained are provided as quadrature-amplitude modulated (QAM) signals.

FIG. 4 shows a conventional datastream transmitter in which data 123 to be transmitted are input via a data input device 201. The data 123 to be transmitted are supplied to a coding device 202 in which the data are first coded and then assembled to form coded data blocks 125, a predeterminable number of bits to be transmitted being allocated to a complex number depending on the scaling. Finally, the coded data blocks 125 output by the coding device 202 are supplied to a retransformation device 203.

Conventionally, the retransformation device 203 transforms the data present in the frequency domain into the time domain by means of an inverse fast Fourier transform (IFFT), N samples of a transmitter signal being generated directly from N/2 complex numbers, where all N samples will be designated as a discrete multitone (DMT) symbol in the text which follows. The complex numbers can be provided as amplitude values of cosinusoidal and sinusoidal oscillations (real component and imaginary component) to be sent out within a data block, the frequencies being distributed equidistantly in accordance with the relation:

$$f_i = i \cdot \frac{1}{T} \quad i = 1, 2, \ldots N/2$$

where T is a period for a transmission of a discrete multitone symbol and N is a number of samples for a discrete multitone symbol. For example, conventional ADSL DMT methods use 256 tones, which can be modulated in amount and phase in each case as sinusoidal tones, in a downstream mode, i.e. in a data transmission from at least one switching center to at least one subscriber. The fundamental frequency is 4.3 kHz and the frequency spacing between successive tones is also 4.3 kHz. Thus, a frequency spectrum from 4.3 kHz (fundamental frequency) to (4.3 kHz+256×4.3 kHz) =1.1 MHz is transmitted. Each DMT symbol is thus represented by a sinusoidal tone which can be modulated in amount and phase, a maximum of 15 bits per symbol usually being represented as complex number. During the transmission of a multitone signal of this type, the problem occurs, however, that transient effects are produced by the transmission channel which, for example, can be constructed as a twisted copper pair, which effects have decayed after, for example, M samples.

In the transmitter device, the last M samples of a DMT symbol are appended to a block start after an inverse fast Fourier transform (IFFT), where the following relation applies: M<N. Due to this cyclic extension (cyclic prefix), a periodic signal can be simulated for the datastream receiver when the transient effect caused by the transmission channel has decayed after M samples and mutual interference between different DMT symbols, i.e. inter-symbol interference (ISI), can be avoided.

As a result, the equalization effort in an equalization device arranged in the datastream receiver can be considerably reduced in conventional methods since after demodulation of the received analog datastream 101 in the datastream receiver, only a simple correction with the inverse frequency response of the transmission channel must be performed in the correction device 112.

A significant disadvantage of a data transmission according to the ADSL method over copper lines in which multitone signals are transmitted consists in that long transient effects occur. The cyclic prefix is thus normally extended in order to supply a periodic signal to the datastream receiver. However, the cyclic prefix must be kept small in relation to the DMT symbol length N, i.e. the following relation must apply:

$$M \ll N,$$

since otherwise a reduction in transmission capacity disadvantageously occurs.

In the ADSL standard, a DMT symbol length of N=64 and a value of a cyclic prefix of M=4, for example, is provided for a data transmission from a subscriber to a switch. To limit a transient effect to the cyclic prefix, a special time domain equalizer (TDEQ) in the form of an adaptive transversal filter which operates at a sampling rate Fs (for example 276 kHz in the switching center with ADSL) is provided in the preprocessing device arranged in the datastream receiver in the known method.

Due to the necessary restriction in the length of the cyclic prefix to, for example, M=4, as mentioned above, the quality of transmission is disadvantageously impaired in conventional methods for transmitting an analog datastream 101 since there is still considerable inter-symbol interference (ISI) even when an equalizer is used in the datastream receiver.

A normal transmission channel also disadvantageously contains high-pass and low-pass filters in order to limit the bandwidth of the analog datastream to be transmitted and in order to suppress out-of-band noise in analog-digital and digital-analog converters which can be constructed, for example, as sigma-delta converters.

In particular, it is disadvantageous that when low-pass filters are excited with DMT signals, transient effects occur which have considerable spectral components in a frequency range above the transmission signal band provided. With a sampling rate Fs of, for example, 276 kHz, convolutional products produce spectral components in the transmission signal band which cannot be eliminated by the equalizer arranged in the datastream receiver. These convolutional products are disadvantageously contained as interference signals in the transmission signal band which impairs the quality of transmission.

A multitone signal generated in the time domain is then transmitted in the form of DMT symbols according to FIG. 4. To provide an analog transmitter signal 211, an analog-digital converter is provided for conversion from a digital multitone signal 303 into the analog transmitter signal 211.

A further known datastream transmitter is shown in FIG. 5 and, in addition to the components illustrated in FIG. 4, a first filtering device 131' and a second filtering device 132' are here arranged between the retransformation device 203 and the digital-analog converter 204.

FIG. 5 illustrates that a typical transmission channel contains high-pass and low-pass filters for limiting the bandwidth of channel transmission signals. As shown in FIG. 5, the discrete multitone (DMT) symbol 208 is high-pass filtered in the first filtering device 131' in order to obtain a filtered discrete multitone symbol 209'. This filtered discrete multitone symbol 209' is low-pass filtered in the second filtering device 132'. The filtering devices 131' and 132' used for band limiting have the disadvantage that in the case of excitation with DMT symbols, transient effects occur which limit a data transmission rate. It is particularly if low-pass filters are used as filtering devices 131' and 132', respectively, that significant spectral components which, in particular, have an effect with a short cyclic prefix, occur in the frequency range of the signal band. After digital-analog conversion, the time domain signal output by the second filtering device 132' is finally transferred in a digital-analog converter where transient effects unsuitably occur.

SUMMARY

It is thus an object of the present invention to provide a method for transmitting an analog datastream from a datastream transmitter to a datastream receiver, in which transient effects are suppressed by measures in the datastream transmitter.

The core of the invention consists in that transient effects are suppressed at the transmitter end in that at least one initial filter value is derived from at least one discrete multitone symbol in order to supply to a stored-value determining device which, in turn, applies stored values to at least one filter device arranged in the datastream transmitter, in such a manner that a formation of transient effects is prevented.

It is thus an advantage of the present invention that a data transmission rate is optimized by suppressing transient effects.

A further advantage of the invention consists in that the datastream receiver can be designed in a simplified and inexpensive manner since only filter measures of lesser complexity must be provided in the datastream receiver for reducing transient effects.

Yet another advantage of the present invention consists in that low-pass filters present in a transmission channel only lead to small spectral components within the signal band.

The essential advantage of the present invention consists in that, with the method according to the invention, a formation of transient effects is already prevented at the transmitter end in the case of a sequential transmission of discrete multitone symbols.

The method for transmitting an analog datastream from a datastream transmitter to a datastream receiver according to the invention essentially exhibits the following steps:

a) inputting data to be transmitted into a data input device of a datastream transmitter;

b) coding the data to be transmitted in a coding device in order to provide coded data;

c) assembling the coded data into data blocks, a predeterminable number of bits to be transmitted being allocated to a complex number depending on the scaling;

d) transforming the coded data blocks into at least one discrete multitone symbol in a transformation device, the transformation device representing a retransformation from a frequency domain into a time domain as provided, for example, by an inverse fast Fourier transform (IFFT);

e) extracting at least one initial filter value from the at least one discrete multitone symbol in an extraction device, a number of end-of-signal values of the multitone symbol corresponding to a filter order being provided;

f) forwarding the at least one initial filter value from the extraction device to a stored-value determining device;

g) applying a frame alignment signal to the stored-value determining device in order to provide frame alignment during a transmission of DMT symbols;

h) determining at least one stored value for at least one filtering device in the stored-value determining device;

i) applying the at least one stored value to the at least one filtering device;

j) applying the at least one discrete multitone symbol to a first filtering device in order to provide a filtered discrete multitone symbol;

k) forwarding the filtered discrete multitone symbol to the second filtering device to which the at least one stored value determined in the stored-value determining device is applied, in order to provide a transient-compensated discrete multitone symbol;

l) converting the transient-compensated discrete multitone symbol into an analog transmitter signal in a digital-analog converter; and m) transmitting the analog transmitter signal via a transmission channel, the transmitter signal being amplifiable by a line driver device.

According to a preferred development of the present invention, the data to be transmitted are provided as digital data values.

According to yet another preferred development of the present invention, a predeterminable number of bits to be transmitted are assembled to form in each case one complex number in the data blocks.

According to yet another preferred development of the present invention, the at least one complex number is transmitted as at least one cosinusoidal oscillation according to a real component and as at least one sinusoidal oscillation according to an imaginary component, the frequencies of the cosinusoidal and sinusoidal oscillations being provided equidistantly distributed according to the following relation:

$$f_i = i \cdot \frac{1}{T} \qquad i = 1, 2, \ldots N/2.$$

According to yet another preferred development of the present invention, the first data values of a DMT symbol are in each case provided as initial filter values.

According to yet another preferred development of the present invention, an inverse fast Fourier transform is provided for transforming the coded data blocks into at least one discrete multitone symbol in the transformation device.

According to yet another preferred development of the present invention, stored values e-1, e-2 are determined from initial filter values u0, u1 and filter coefficients b0, b1, a1 in the stored-value determining device, for example in accordance with the following relation:

$$e\text{-}1 = (1 - b0)^* u0$$

$$e\text{-}2 = u1^*(1 - b0) + u0^*(a1 - b1)$$

where the above relation is specified for a specific second-order digital filter with predetermined stored value by way of example.

According to yet another preferred development of the present invention, a number of stored values corresponding to the filter order n of the filter device is determined from a corresponding number of initial filter values in the stored-value determining device.

According to yet another preferred development of the present invention, the analog transmitter signal is driven into the transmission channel by means of a line driver device.

According to yet another preferred development of the present invention, the stored values determined in the stored-value determining device are supplied either to the first filtering device or the second filtering device.

According to yet another preferred development of the present invention, the stored values determined in the stored-value determining device are supplied both to the first filtering device and to the second filtering device.

According to yet another preferred development of the present invention, the first two data values u0, u1 of the discrete multitone symbol are provided including a prefix for determining two stored values e-1, e-2 if a filter order is two. With a higher filter order than two, a correspondingly higher number of data values is advantageously provided.

According to yet another preferred development of the present invention, an extraction of at least one initial filter value from the at least one discrete multitone symbol is provided after each transmitted multitone symbol in an extraction device.

The circuit arrangement according to the invention for transmitting an analog datastream also exhibits the following:

a) a data input device for inputting data to be transmitted;

b) a coding device for coding the data to be transmitted and for subsequently assembling them into coded data blocks;

c) a transformation device for transforming the coded data blocks into at least one discrete multitone symbol, the transformation provided by the transformation device representing a retransformation from the frequency domain into the time domain and operating inversely to the transformation provided in the datastream receiver;

d) an extraction device for extracting at least one initial filter value from at least one discrete multitone symbol, the initial filter values being taken from the first data values of a multitone symbol including the cyclic prefix;

e) a stored-value determining device for determining at least one stored value for at least one filter device in dependence on the at least one initial filter value and a frame alignment signal supplied to the stored-value determining device which provides alignment with the frame format of the multitone symbol;

f) a digital-analog converter for converting a discrete multitone symbol, which is transient-compensated by the at least one filter device, into an analog transmitter signal; and g) a transmission channel for transmitting the analog transmitter signal, where an amplification of the analog transmitter signal to be transmitted can be provided before transmission.

BRIEF DESCRIPTION OF THE DRAWINGS

Exemplary embodiments of the invention are described in greater detail in the description following and are represented in the drawings, in which.

In the figures, identical reference symbol designate identical or functionally identical components or steps.

DETAILED DESCRIPTION

Figure 2A:
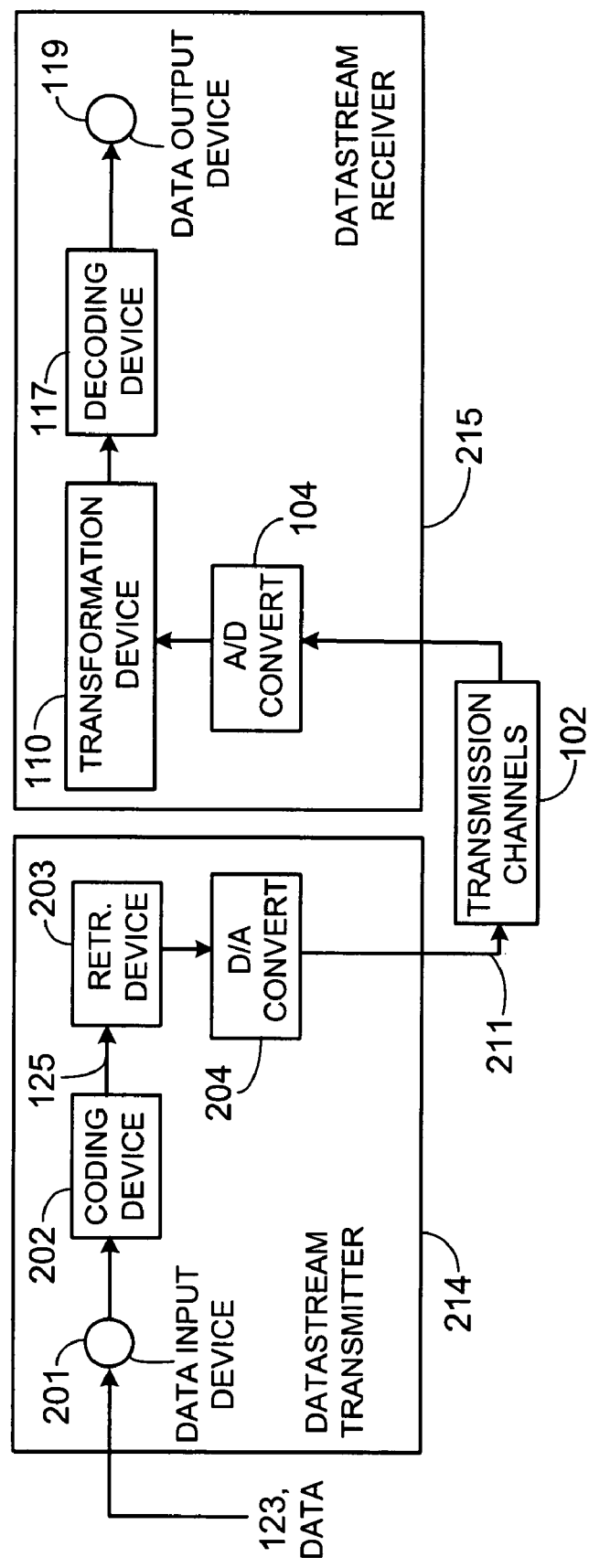
FIG. 2a shows a block diagram of a transmission link for multitone symbols with datastream transmitter, transmission channel and datastream receiver.

FIG. 2a shows a basic block diagram of an arrangement for transmitting an analog datastream according to the DMT method, the datastream transmitter 214, the transmission channel 102 and the datastream receiver 215 being illustrated.

Datastream transmitter 214 and datastream receiver 215 consist of separately identifiable blocks which will be described briefly in the text which follows. A data input device 201 is used for inputting data to be transmitted, the data input being forwarded to a coding device 202. In the coding device 202, the datastream is decoded in accordance with a conventional method and supplied to a retransformation device 203.

The retransformation device 203 provides a transformation of data present in the frequency domain into data present in the time domain. The retransformation device 203 can be provided, for example, by a device in which an inverse fast Fourier transform (IFFT) is performed.

It should be pointed out that the transformation from the frequency domain into the time domain, performed in the retransformation device 203, represents a transformation which is inverse to the transformation performed by the transformation device 110.

Finally, the digital datastream output by the retransformation device 203 is converted into an analog datastream by means of a digital-analog converter 204. The analog datastream, which is now present in the time domain, is supplied to a transmission channel 102 which provides the data transmission described above, and during the transmission there can be band-pass filtering, high-pass filtering and/or low-pass filtering and an application of noise to the analog datastream 101. The analog datastream 101 is furthermore supplied to the analog-digital converter 104 arranged in the datastream receiver 215, which converts the received analog datastream 101 into a digital datastream 103, the converted digital datastream 103 being supplied to the transformation device 110.

After a transformation, which is the inverse to that in the retransformation device 203, from the frequency domain into the time domain, the transformed datastream, after passing through a correction device (not shown) and a determining device (not shown), is decoded in the decoding device 117. The decoded datastream is finally output via the data output device 119.

Figure 2B:
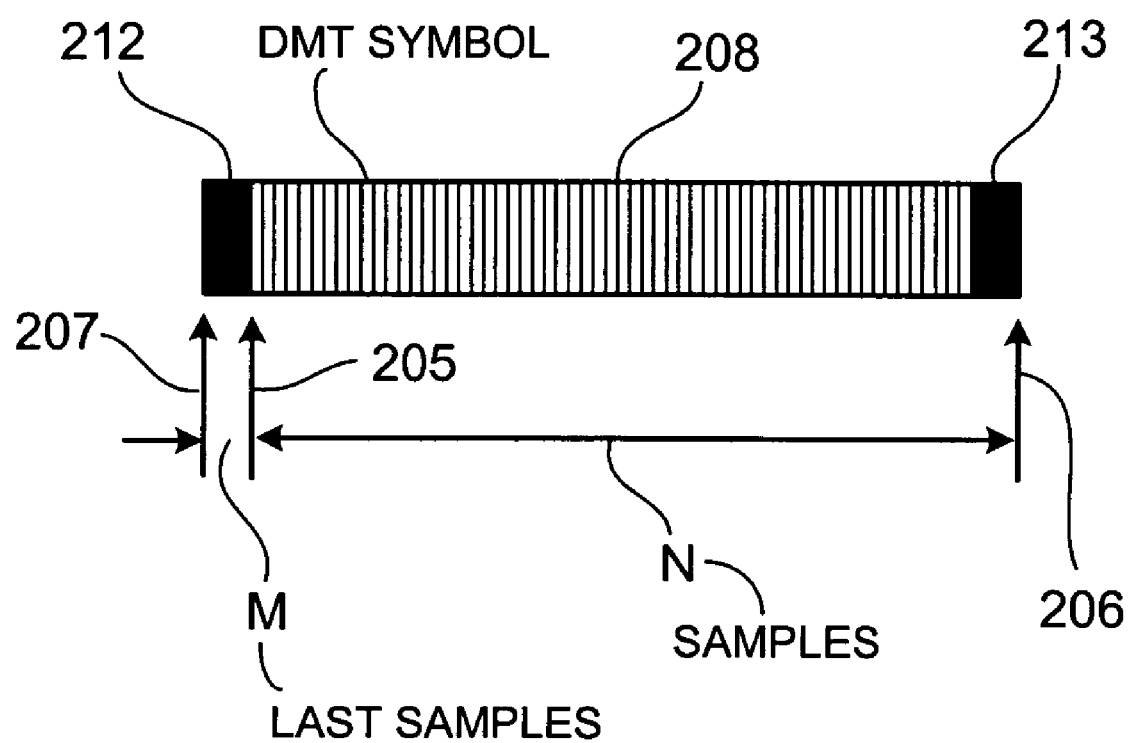
FIG. 2b diagrammatically shows a structure of a multitone symbol with cyclic prefix.
Figure 3:
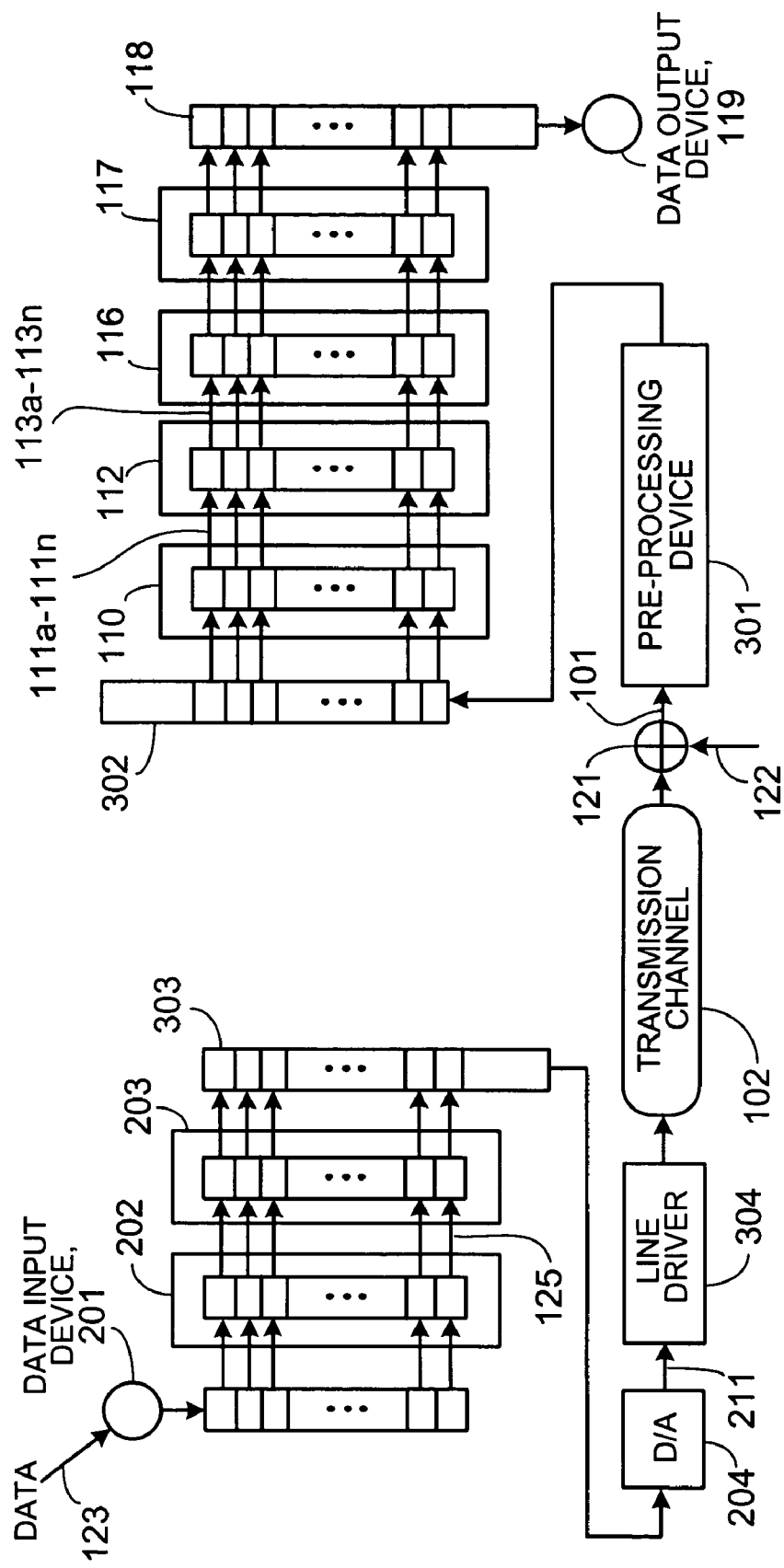
FIG. 3 shows the transmission arrangement for transmitting an analog datastream, illustrated in FIG. 2a, in greater detail as a complete link.

FIG. 2b shows an arrangement of a discrete multitone symbol, the analog datastream to be transmitted being provided as a sequence of multitone symbols. Before the data transformed in the retransformation device 203 are forwarded to the digital-analog converter 204, the last M samples of a multitone symbol are again appended to the start of the block, which defines a cyclic prefix and where the following applies:

M<N

This makes it possible to simulate a periodic signal for a datastream receiver if the transient effect caused by the transmission channel has decayed after M samples, i.e. there is no inter-symbol interference (ISI).

As shown in FIG. 2b, the original multitone symbol has a length of N samples, for example N=64 whereas, for example, the last four values are placed at the start of the DMT symbol 205 as a cyclic prefix 212, where the following applies:

M=4.

The total length of a multitone symbol 208, together with the DMT end-of-DMT symbol values 213 appended to the start of the symbol 205, is then M+N from the start of prefix 207 to the end of the DMT symbol 206.

It should be pointed out that the number of end-of-DMT symbol values 213 cyclically appended to the start of the symbol 205 must be kept as small as possible, i.e. M<<N in order to obtain the least possible reduction in transmission capacity and quality.

In another example, a multitone symbol 208 consists of 256 complex numbers which means that 512 time samples (real and imaginary component) must be transmitted as a periodic signal. In this example, if a number of 32 end-of-DMT symbol values 213 are copied to the start of the symbol as cyclic prefix 212, the total length of the time sample to be transmitted is calculated at 544 which results in a sampling period $T_A$ of $544 \times 10^{-6}/2.208$ sec or 0.25 ms, respectively, at a maximum tone frequency of a DMT signal of 2.208 MHz, the symbol transmission frequency being calculated from $f_{DMT} = 1/T_A \approx 4$ kHz.

Figure 1:
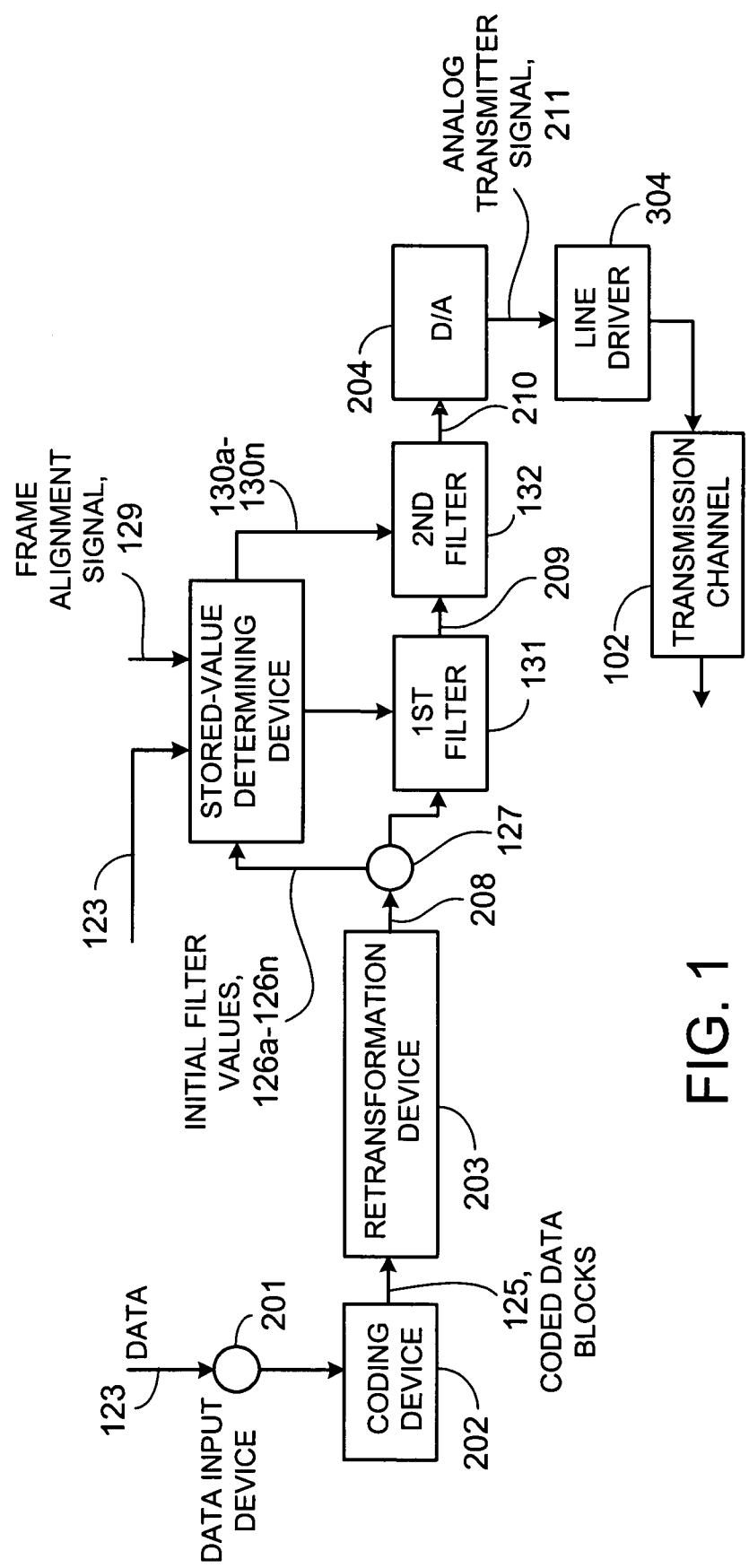
FIG. 1 shows a circuit arrangement for transmitting an analog datastream from a datastream transmitter to a datastream receiver, in which transient effects are suppressed, according to an exemplary embodiment of the present invention.

FIG. 1 shows a block diagram of a datastream transmitter in which a first filtering device 131 and a second filtering device 132 are preloaded with stored values 130a–130n in such a manner that a suppression of transient effects is already provided at the transmitter end. Data 123 to be transmitted are input into the data input device 201, coded in a coding device 202 and assembled into data blocks 125 as described above.

The coded data blocks 125 are supplied to the retransformation device 203 which provides a digital datastream in the form of discrete multitone (DMT) symbols 208 by means of an inverse transformation from a frequency domain into a time domain.

The DMT symbol datastream 208 is supplied to the first filtering device 131 via an extraction device 127. Initial filter values 126a–126n are extracted in the extraction device 127, the number of extracted initial filter values n depending on the order of the filter device 131 and/or of the second filter device 132. If, for example, as will be described below with reference to FIG. 6, a second-order filter is used, two initial filter values 126a and 126b are extracted in the extraction device 127 and, as already stated above, the first two data values of a multitone symbol including the cyclic prefix are forwarded as illustrated in FIG. 2b.

The initial filter values 126a–126n are supplied to the stored-value determining device 128 where the stored-value determining device also aligns a frame alignment signal 129 for alignment with respect to a transmission of the datastream to be transmitted in the form of multitone symbols.

It should be pointed out that, although second-order filters are shown by way of example in the exemplary embodiment of the present invention illustrated, filters of a different order can be used. In the second-order filter illustrated here and described below in greater detail with reference to FIG. 6, stored values 130a–130n are calculated in the stored-value calculating device 128 in accordance with the following formula, the initial filter values provided for a second-order filter being designated by u0 and u1 whereas the provided stored values are designated as e-1 and e-2:

$$e\text{-}1 = (1-b0) * u0$$

$$e\text{-}2 = u1 * (1-b0) + u0 * (a1-b1)$$

second filter coefficients being designated by b0 and b1 and first filter coefficients being designated by a1.

Figure 6:
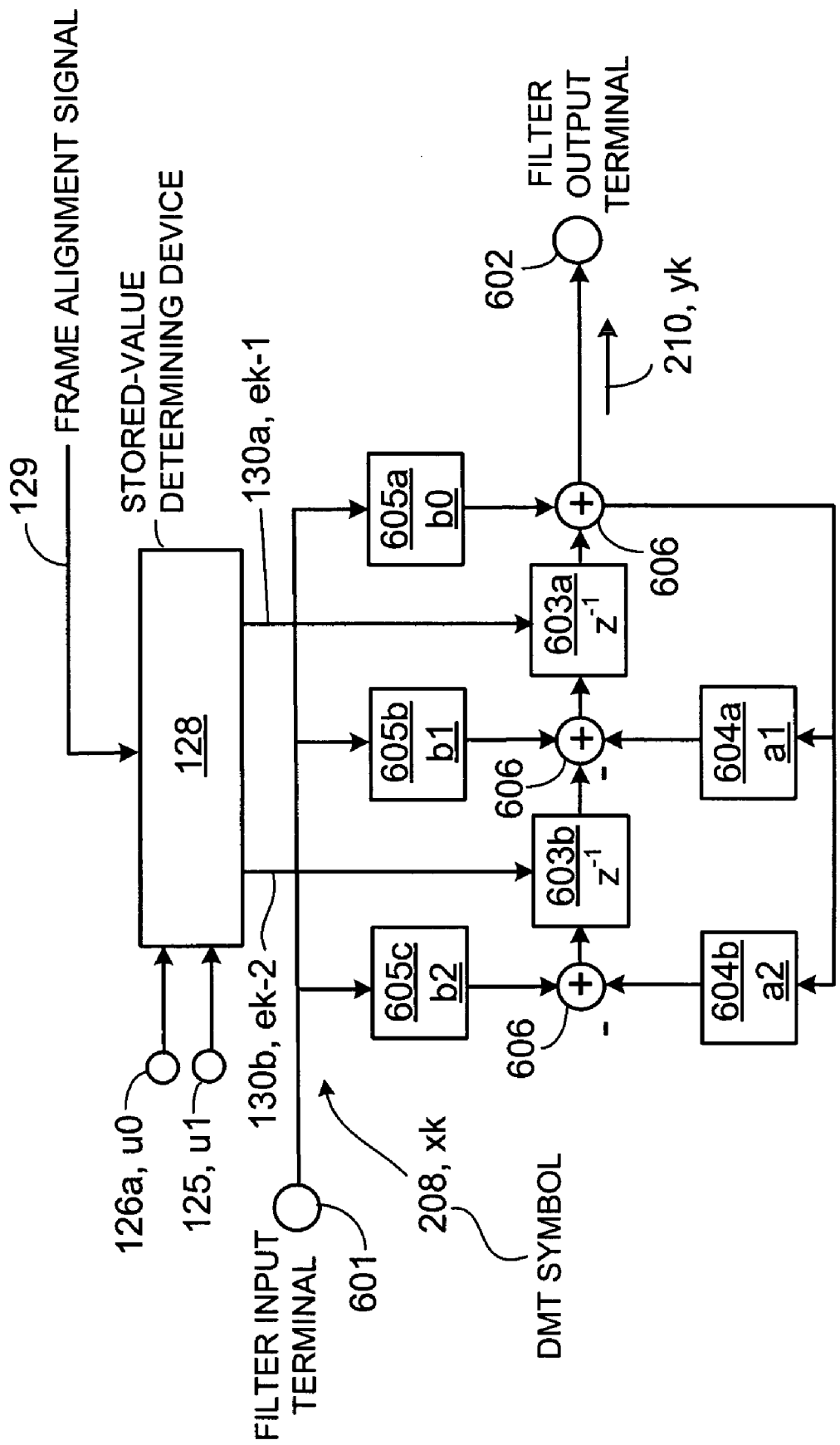
FIG. 6 shows a second-order filtering device to which stored values from a stored-value determining device are applied according to an exemplary embodiment of the present invention.

The filter coefficients correspond to the recursive second-order filter shown in FIG. 6. The calculated stored values e-1, e-2 and 130a–130n (for an arbitrary filter order n) are finally supplied to the first filtering device 131 and the second filtering device 132. These stored values are provided for preloading the first filtering device 131 and/or the second filtering device 132 in order to reduce transient effects by including the stored values e-1 and e-2 into a calculation of the output values of the filter device as will be described with reference to FIG. 6.

In the exemplary embodiment illustrated, a first filtering device 131 can be provided by a high-pass filter whereas the second filtering device 132 can be provided by a low-pass filter. It is particularly when low-pass filters are excited with DMT symbols that transient effects occur which have considerable spectral components above the actual transmission band in the frequency range.

By preloading the memories of the filtering device 132 with stored values e-1 and e-2 according to the invention, these transient effects are considerably reduced. Whereas the first filtering device 131 converts the discrete multitone symbol 208 into a filtered discrete multitone symbol 209, further filtering by means of the preloaded second filtering device 132 according to the invention creates from the filtered discrete multitone symbol 209 a transient-compensated discrete multitone symbol 210 which then is supplied to a conventional digital-analog converter 204 as already described with reference to FIGS. 4 and 5.

The analog transmitter signal 211 obtained by a digital-analog conversion performed in the digital-analog converter 204 is finally supplied to a line driver device 304 in which the analog datastream is amplified and/or the analog datastream is driven into the transmission channel 102.

FIG. 6 shows a recursive second-order filter according to an exemplary embodiment of the present invention. Whereas the numbers as reference symbols refer to an arbitrary filter order, the initial filter values u0 and u1 correspond to a second-order filter and are supplied to the stored-value determining device 128 as described with reference to FIG. 1.

Furthermore, this stored-value determining device 128 is supplied with a frame alignment signal 129 as explained above. $Z^{-1}$ in each case means a delay element according to a Z transformation whereas the first filter coefficients are designated by a1 and a2 and the second filter coefficients are designated by b0, b1 and b2.

In the recursive second-order filter shown in FIG. 6, three summation devices 606 are provided in order to superimpose the transient-compensated discrete multitone signal 210, weighted by the first filter coefficients a1 and a2, on the discrete multitone symbol 208 supplied via a filter input terminal 601 and weighted with the second filter coefficients 605a, 605b and 605c, the first filter coefficients a1 and a2 being provided with a negative sign due to the recursive arrangement of the filter. The transient-compensated discrete multitone symbol is output via a filter output terminal 602.

Using the stored values determined by the stored-value determining device 128, which are written into the memory elements ($z^{-1}$) of the second-order filter, a determination of filter output values yk is obtained in accordance with the following equations:

$$yk = b0*uk + ek\text{-}1$$

$$ek\text{-}1 = -yk*a1 + b1*uk + ek\text{-}2$$

$$ek\text{-}2 = -yk*a2 + b2*uk$$

where it can be seen that the memory contents ek-1 and ek-2 are included in the calculation of the output values of the filter.

The first filtering device 131 and the second filtering device 132 can also be constructed as a unit in an arrangement of a recursive filter, this filter unit being supplied once with stored values 130a–130n from the stored-value determining device 128.

Furthermore, the filter arrangement shown in the exemplary embodiment described in FIG. 1, in which the first filtering device 131 is constructed as a high-pass filter whereas the second filtering device 132 is constructed as a low-pass filter, can be reversed so that the first filtering device 131 is arranged to follow the second filtering device 132.

Figure 4:
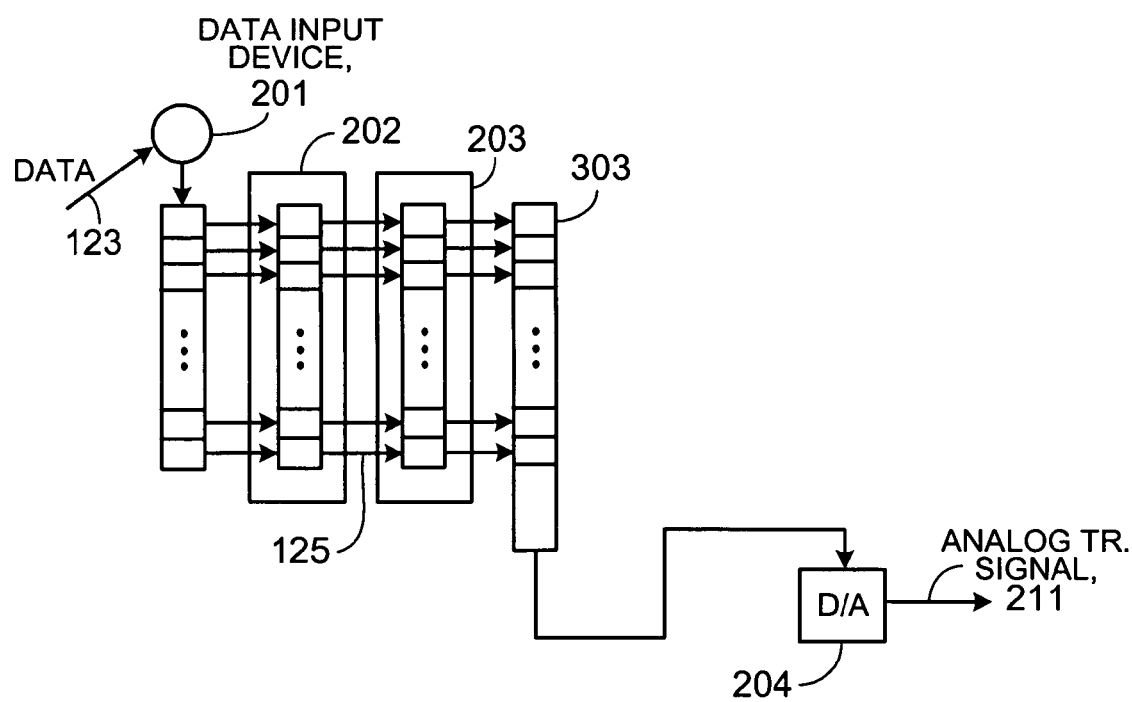
FIG. 4 shows a detailed arrangement of a datastream transmitter without filter devices according to the prior art.
Figure 5:
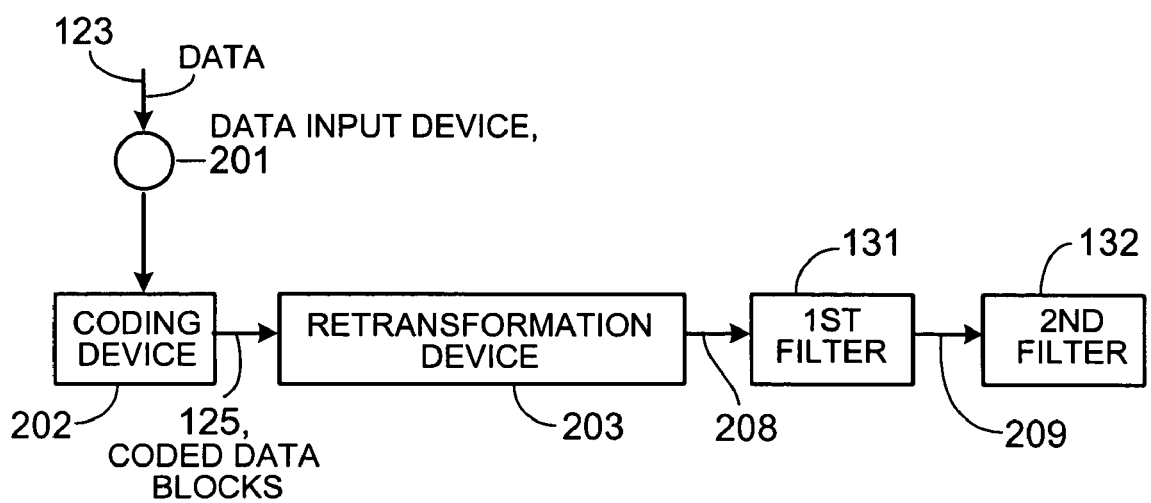
FIG. 5 shows a block diagram of a conventional datastream transmitter with a first filtering device and a second filtering device.

With respect to the circuit arrangements of conventional datastream transmitters shown in FIGS. 4 and 5, reference is made to the introduction to the description.

Although the present invention has been described above by means of preferred exemplary embodiments, it is not restricted to these but can be modified in various ways.

Having described the invention, and a preferred embodiment thereof, what is claimed as new and secured by letters patent is:

1. A method for transmitting an analog datastream from a datastream transmitter to a datastream receiver, the method comprising:
   inputting data to be transmitted into a data input device of a datastream transmitter;
   coding the data to be transmitted, thereby generating coded data;
   assembling the coded data into coded data blocks;
   transforming the coded data blocks into at least one discrete multitone symbol;
   extracting at least one initial filter value from the at least one discrete multitone symbol;
   forwarding the at least one initial filter value to a stored-value determining device;
   applying a frame alignment signal to the stored-value determining device;
   determining, as a function of the at least one initial filter value and the frame alignment signal, at least one stored value for a first filtering device;
   applying the at least one stored value to the first filtering device;
   applying the at least one discrete multitone symbol to the first filtering device to provide a filtered discrete multitone symbol;
   forwarding the filtered discrete multitone symbol to a second filtering device to which the at least one stored value determined in the stored-value determining device is applied, to provide a transient-compensated discrete multitone symbol;
   converting the transient-compensated discrete multitone symbol into an analog transmitter signal; and
   transmitting the analog transmitter signal via a transmission channel.

2. The method of claim 1, wherein inputting data comprises providing digital data values as the data to be transmitted.

3. The method of claim 1, further comprising assembling a predeterminable number of bits to be transmitted to form, in each case, a complex number in the coded data blocks.

4. The method of claim 3, further comprising transmitting the complex number as at least one cosinusoidal oscillation according to a real component and as at least one sinusoidal oscillation according to an imaginary component, frequencies of the cosinusoidal and sinusoidal oscillations being equidistantly distributed.

5. The method of claim 1, wherein forwarding the at least one initial filter value comprises providing, as initial filter values, the first data values of a DMT symbol.

6. The method of claim 1, wherein transforming the coded data blocks into at least one discrete multitone symbol comprises performing an inverse Fourier transform.

7. The method of claim 1, further comprising determining stored values (e-1, e-2) from initial filter values (u0, u1) and filter coefficients (b0, b1, a1) in accordance with a filter topology according to the following relation:

$$e\text{-}1 = (1-b0)*u0$$

$$e\text{-}2 = u1*(1-b0) + u0*(a1-b1).$$

8. The method of claim 1, further comprising determining a number of stored values corresponding to a filter order of a filtering device from a corresponding number of initial filter values.

9. The method of claim 1, wherein transmitting the analog transmitter signal comprises driving the analog transmitter signal into the transmission channel by means of a line driver device.

10. The method of claim 1, further comprising supplying the stored values determined in the stored-value determining device to at least one of the first filtering device and the second filtering device.

11. The method of claim 1, wherein extracting at least one initial filter value comprises extracting at least one initial filter value from the at least one discrete multitone symbol after each transmitted multitone symbol in the extraction device.

12. The method of claim 1, further comprising providing a number of data values (u0, u1) of the discrete multitone symbol, corresponding to a number of a filter order, including a prefix for determining stored values (e-1, e-2).

13. The method of claim 1, wherein transforming the coded data blocks into at least one discrete multitone symbol comprises performing a wavelet transformation.

14. A circuit device for transmitting an analog datastream, the circuit device comprising:
   a data input device for inputting data to be transmitted;
   a coding device for coding the data and for subsequently assembling the data into coded data blocks;
   a retransformation device for transforming the coded data blocks into at least one discrete multitone symbol;
   an extraction device for extracting at least one initial filter value from the at least one discrete multitone symbol;
   at least a first and second filtering device;
   a stored-value determining device for determining at least one stored value for at least one of the first and second filtering devices as a function of the at least one initial filter value and a frame alignment signal;
   a digital-analog converter for converting a discrete multitone symbol, which is transient-compensated by at least one of the first and second filtering devices, into an analog transmitter signal; and
   a transmission channel for transmitting the analog transmitter signal.

15. The circuit arrangement of claim 14, wherein the first filtering device comprises a high-pass filter.

16. The circuit arrangement of claim 14, wherein the second filtering device comprises a low-pass filter.

17. The circuit arrangement of claim 14, wherein at least one of the first and second filtering devices comprises a band-pass filter.

18. The circuit arrangement of claim 14, further comprising a line driver device connected to the transmission channel for driving the analog transmitter signal.

19. The circuit arrangement of claim 14, wherein the first filtering device and the second filtering device are constructed as a unit in the arrangement of a recursive filter.

20. The circuit arrangement of claim 14, wherein the first filtering device is arranged to follow the second filtering device.

* * * * *